Aug. 4, 1959 — E. D. MOSKOW — 2,898,134
INTERIOR DIAMETER MAINTAINING SUPPORT FOR SEAL RINGS
Filed July 16, 1956
FIG. 1.
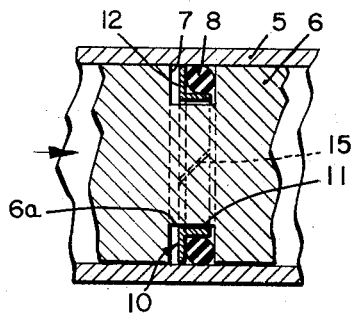
FIG. 2.
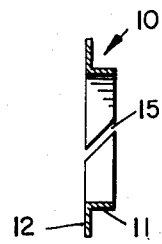
FIG. 3.
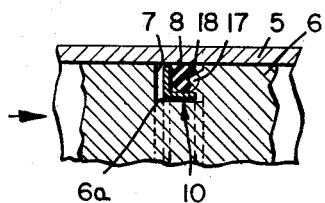
FIG. 4.
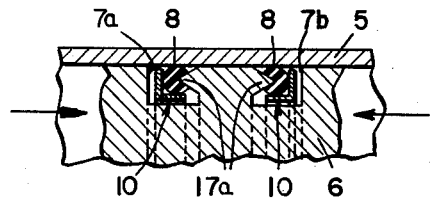
FIG. 5.
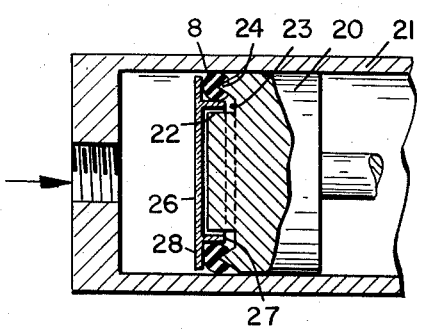
FIG. 6.
FIG. 7.
FIG. 9.
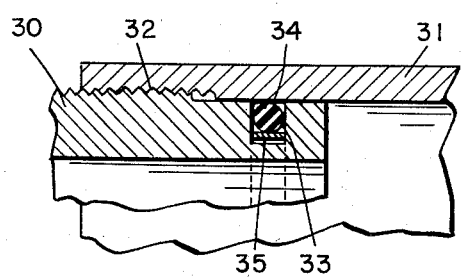
FIG. 8.
INVENTOR
EUGENE D. MOSKOW
BY
Mason & Graham
ATTORNEYS

United States Patent Office 2,898,134
Patented Aug. 4, 1959

2,898,134

INTERIOR DIAMETER MAINTAINING SUPPORT FOR SEAL RINGS

Eugene D. Moskow, Los Angeles, Calif., assignor to Benbow Mfg. Co., Inc., Culver City, Calif., a corporation of California Application July 16, 1956, Serial No. 597,958

2 Claims. (Cl. 286—26)

This invention has to do with seal ring assemblies including means for maintaining the interior diameter of the seal ring against shrinkage.

Seal rings, particularly those made of some plastic materials, have the shortcoming of shrinking at low temperatures, with the result that they become so contracted as to retract from proper sealing position. When this occurs, leakage takes place past the sealing ring. This difficulty has been experienced in a pronounced way where such seal rings are employed, for instance, in guided missiles, which are often subjected to extremely low temperatures.

It is an object of my invention to provide support means for maintaining the internal diameter of such rings under all conditions, such as a very wide range of temperature conditions, for example, thus insuring that shrinkage will not result in the ring being drawn out of proper sealing position.

Another object of my invention is to provide a combination seal structure incorporating my novel support means for maintaining the internal diameter of the seal ring and preventing the seal ring from seizing the bottom of the groove.

Other objects and advantages will appear hereinafter.

While the features which I believe to be new will be pointed out in the appended claims, so that my invention may be better understood, I shall now describe in detail presently preferred embodiments thereof for which purpose I shall refer to the accompanying drawings wherein, Fig. 1 is a fragmentary longitudinal sectional view of a piston and cylinder assembly embodying my invention;

Fig. 2 is an axial sectional view of the support means for maintaining the interior diameter of the seal ring;

Fig. 3 is a fragmentary sectional view showing a modified seal assembly;

Fig. 4 is a fragmentary sectional view somewhat like that of Fig. 3 except that a double-seal assembly is utilized;

Fig. 5 is a longitudinal sectional view of a further modified form of the invention;

Fig. 6 is a front elevational view of the support means of Fig. 5 for maintaining the inner diameter of the seal ring;

Fig. 7 is an end elevation of the piston of Fig. 5;

Fig. 8 is a cross-sectional view of the seal ring of Figs. 3–5; and

Fig. 9 is a fragmentary section showing a further modification of my seal assembly employed as a seal in a joint.

Referring now to the drawings, in Figs. 1 and 2, I show a conventional cylinder 5 and a conventional piston 6 having the usual annular seal ring groove 7. A conventional deformable O ring 8 is mounted within the groove.

To prevent the O ring from pulling away from the inner periphery of the cylinder by virtue of shrinkage, I provide and nest concentrically in seal ring 8 an internal diameter-maintaining ring or support 10 which is relatively rigid and is preferably of angular or L-shaped cross-section whereby to provide an inner annular abutment portion 11 and an annular backing portion 12. The ring may be split as shown at 15 to facilitate assembly. In the arrangement of Fig. 1, the fluid pressure against which the seal is to be effective is applied in the direction of the arrow.

Thus it will be apparent that since the abutment portion 11 positively prevents the ring from constricting about the reduced diameter portion 6a of the piston forming the bottom of the ring groove, the ring is always maintained in sealing position. The backing portion 12 insures that the ring 10 and the O ring 8 will not be inadvertently separated.

In Fig. 3 I show a modification wherein the parts are as before described and are given like reference numerals, except that here my support ring 10 is incorporated in a seal assembly wherein a side wall of the groove 7 has an annular protuberance 17 of conical cross-section and wherein the seal ring 8 is provided with an annular groove 18 of conical cross-section conforming to the protuberance 17, the protuberance fitting into the groove so that fluid pressure applied in the direction of the arrow will force the seal ring over the inclined surface of the protuberance, thus further facilitating the sealing.

In Fig. 4 I show a further modification in the form of a double seal. This type of seal is intended for use in a situation in which a pressure seal must be provided for both directions of travel of the piston 6 as it reciprocates in the cylinder 5, and consequently two seal rings 8 are provided, each preferably having the annular groove 18 of conical cross-section. Here, two longitudinally spaced seal ring grooves 7a, 7b are provided in the piston and the right hand side wall of groove 7a and the left hand side wall of groove 7b have the annular protuberances 17a of conical cross-section fitting into the seal ring groove 18. For each of the seal rings I provide a seal ring supporting ring 10 constructed as before described.

In Figs. 5–7 I show a further modification for incorporating my seal ring support means with the inner end of a piston or plunger 20 mounted in a cylinder 21. Here for the reception of the seal ring 8, the inner end of the piston is cut away to provide an annular recess presenting a radially facing annular surface 22 and an axially inwardly facing surface 23, the surface 23 being provided with an annular protuberance 24 of conical cross-section which engages in the corresponding groove 18 of a seal ring. My seal ring support device as here shown comprises a plate 26 having an annular axially outwardly directed flange 27 providing the inner abutment for the seal ring, while the marginal portion of the plate provides the annular backing portion 28 corresponding to the backing portion 12 of the ring 10 before described. This type of seal is designed for use where the piston 20 has only extremely limited travel in the cylinder.

In Fig. 9 I show a further modification wherein my seal ring support means is incorporated in a seal for a tube coupling. Here I show male member 30 and female member 31 of a tube joint, said members being threadedly connected at 32. The male member 30 has adjacent its inner end a peripheral seal ring grove 33 carrying a seal ring 34. My support ring 35 is disposed within the groove nested in the seal ring. In this modification, since the seal ring groove is relatively narrow, I omit the backing flange portion designated by the numeral 12 in the foregoing described embodiments.

It will be observed, by reference to the drawings, that, in the embodiments of Figs. 1–4 and 9, in which my seal device is mounted in a ring groove, the flat ring support which is engaged between the inner periphery of the seal ring and the bottom of the groove is of a width, in relation to the width of the groove and the major cross sectional thickness of the ring, to prevent the ring from contracting into position between a side edge of the ring support and a side wall of the groove. That is, the width of the support is shown as being greater than ⅔ the width of the groove and the major cross sectional thickness of the ring.

Although I have illustrated and described a preferred form of my invention, I contemplate that various changes and modifications can be made therein without departing from the invention, the scope of which is indicated by the following claims.

I claim:

1. The combination with a mechanical assembly having a pair of interfitting members the inner one of which presents an annular peripheral fluid pressure seal-receiving groove, of a fluid pressure seal means in said groove and comprising a pair of nested, coaxial rings the outer one of which is deformable, compressible and contractible and the inner one of which is relatively non-contractible whereby to resist contraction of said outer ring, one side wall of said fluid pressure receiving groove presenting an annular projecting portion of conoidal cross section, said outer ring having an annular side groove for receiving said projecting portion, and said inner ring having a radially disposed annular flange engaging the side of said outer ring opposite from the side having said last-named groove therein.

2. The combination with a piston-cylinder assembly wherein the piston has an annular peripheral groove, of a resilient, deformable and contractible seal ring mounted in said groove and an annular rigid supporting member coaxial with said ring and engaging between the inner periphery of said ring and the bottom wall of said groove; said ring supporting member having a width sufficient, in relation to the width of said groove and the major cross sectional thickness of said ring, to prevent said ring from contracting into position between a side edge of said member and a side wall of said groove, and presenting a substantially flat outer peripheral seal ring engaging surface allowing engagement of said seal ring with a side wall of said groove whereby to provide a seal between said side wall and said seal ring.

References Cited in the file of this patent

UNITED STATES PATENTS

| | | |
|---|---|---|
| 1,483,582 | Jacobs | Feb. 12, 1924 |
| 2,158,833 | Robinson | May 16, 1939 |
| 2,307,828 | Eggleston | Jan. 12, 1943 |
| 2,521,248 | Parker | Sept. 5, 1950 |
| 2,570,427 | Chillson et al. | Oct. 9, 1951 |
| 2,615,769 | Barnes et al. | Oct. 28, 1952 |
| 2,661,967 | Mitchell | Dec. 8, 1953 |